Feb. 2, 1971  C. E. KURTZ  3,560,113
CONTROL VALVE

Filed Aug. 11, 1969  2 Sheets-Sheet 1

INVENTOR
CURTIS E. KURTZ

INVENTOR
CURTIS E. KURTZ

United States Patent Office 3,560,113
Patented Feb. 2, 1971

3,560,113
CONTROL VALVE
Curtis E. Kurtz, Arlington Heights, Ill., assignor to Borg-Warner Corporation, Chicago, Ill., a corporation of Delaware
Filed Aug. 11, 1969, Ser. No. 849,074
Int. Cl. F04b 49/00
U.S. Cl. 417—294                                              9 Claims

ABSTRACT OF THE DISCLOSURE

A flow control valve for a fluid power transmission having a valve body receiving a slidable valve spool responsive to centrifugal action to control flow. A dash-pot valve is provided in the spool responsive to fluid pressure to control fluid flow.

BACKGROUND OF THE INVENTION

This invention relates to a flow control valve. More particularly it relates to a flow control valve responsive to centrifugal action and to fluid pressure to control flow.

Flow control valves find wide application in all forms of hydraulic circuitry. They are, for example, commonly utilized in hydraulic power transmission arrangements to control the flow to various system elements to produce desired system output characteristics. One such system is illustrated by my invention shown in U.S. Pat. 3,444,709, issued May 20, 1969 and entitled, "Hydraulic Transmission For Fabric-Treating Machines."

The power transmission of that patent is particularly suited for fabric treating machines and includes an arrangement for driving a rotatable fabric container during a "spin cycle" of the machine. The transmission includes a hydraulic pump such as a gerotor pump including a rotatable pumping element driven by a prime mover such as an electric motor, and a relatively stationary pumping element connected to the fabric container. Rotation of the container is accomplished by establishing a hydraulic couple between the rotating pumping element and the relatively stationary element to produce a driving-driven relationship resulting in consequent rotation of the relatively stationary element and fabric container.

The driving couple is established by a flow control valve which blocks the pump discharge. Rotation of the rotatable pumping element creates a reaction torque in the relatively stationary pumping element, by virtue of the presence of the fluid between the elements and the blocked discharge. The flow control valve is responsive to centrifugal action to communicate the pump discharge with the fluid sump as the maximum rotational speed of the fabric container is attained. The flow path is increased with increasing speed and the resulting flow reduces the effective couple between the relatively rotatable and relatively stationary pumping elements thereby limiting the maximum rotational speed of the fabric container.

The present invention is directed to an improved form of control valve suitable for use in the above described fluid transmission system. The valve of the present invention provides the necessary restriction to pump discharge to create a driving couple. It is responsive to centrifugal action to provide fluid communication between the pump discharge and fluid sump to reduce the effectiveness of the fluid couple to limit maximum rotational speed. In addition the valve is responsive to pump discharge pressure to provide an initial flow path of decreasing size to insure smooth and efficient initiation of the fluid couple and conjoint rotation of the pump elements.

SUMMARY OF THE INVENTION

Very generally, the flow control valve of the present invention is responsive to centrifugal action and to fluid pressure to control flow. It includes a valve body supporting a slidable valve spool responsive to centrifugal action to control flow. It further includes a dash-pot valve supported by the valve spool responsive to fluid pressure to control flow.

Particular objects and advantages of the invention will become apparent from the following description having reference to the accompanying drawings.

DETAILED DESCRIPTION

Figure 1:
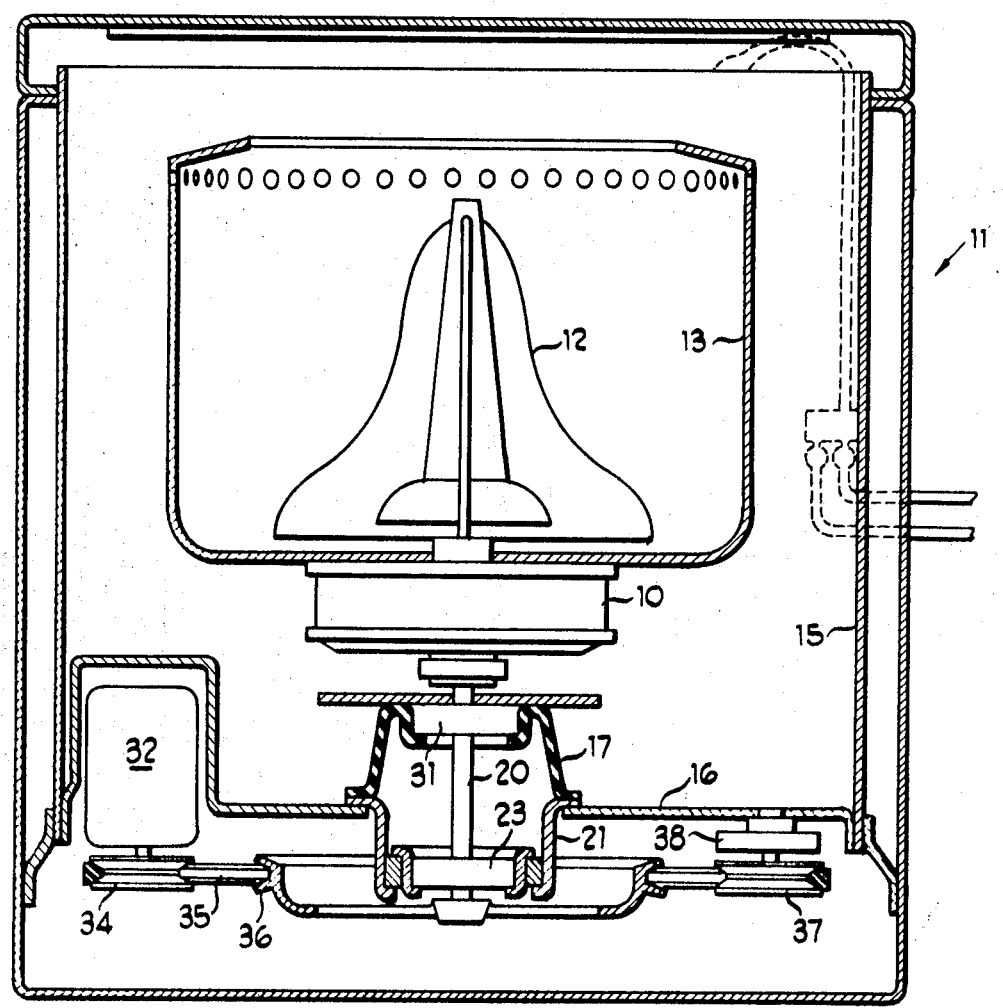
FIG. 1 is a sectional elevational view of a fabric-treating machine including a hydraulic power transmission embodying a flow control valve illustrative of the present invention.

Turning now to the drawings, there is shown a hydraulic power transmission for a fabric treating machine including a flow control valve illustrative of the principles of the present invention. The hydraulic power transmission generally designated 10, is disposed within a fabric-treating machine 11, including on oscillatable agitator 12 and a fabric container or basket 13 rotatable to extract liquid from the clothes.

The machine comprises a cabinet or casing supporting a water container or tub 15 enclosed at its bottom end by a bulkhead 16 and a flexible rubber, inverted cup-shaped member 17 overlying a central opening in the bulkhead.

The basket 13, agitator 12, transmission 10, and a transmission drive shaft 20, are supported on a cylindrical steel mounting member 21. The drive shaft 20 extends through the members 21 and 17 and is rotatably mounted on the member 21 by a ball-bearing assembly 23. Disposed within the upper opening of the flexible member 17 and surrounding the drive shaft 20 is a roller-bearing assembly 31, the member 17 having a cylindrical shape engaging the outer race of the assembly 31, the inner race of the assembly being secured to the drive shaft. The flexible member 17 is effective to vertically align the bearing assemblies 23 and 31 and resistively permits gyratory movement of the basket, agitator and transmission, about the lower end of the drive shaft due to an unbalanced load during rotation of the basket.

The drive shaft 20 is connected to an electric motor 32 supported on the cabinet. The motor 32 has a drive pulley 34 connected by a belt 35 to a pulley 36, secured to the end of the drive shaft 20, and to a pulley 37 connected to a water pump 38 provided for exhausting water from the tub through an opening in the bulkhead 16 during rotation of the motor.

The hydraulic transmission 10 includes a fluid pump 40 having its housing connected to the basket; a vane-type hydraulic motor 41 for driving the agitator; a control valve 42 for the motor 41; a solenoid-controlled brake 43 for the basket 13; and spin-control valve 77 illustrative of the present invention.

Figure 3:
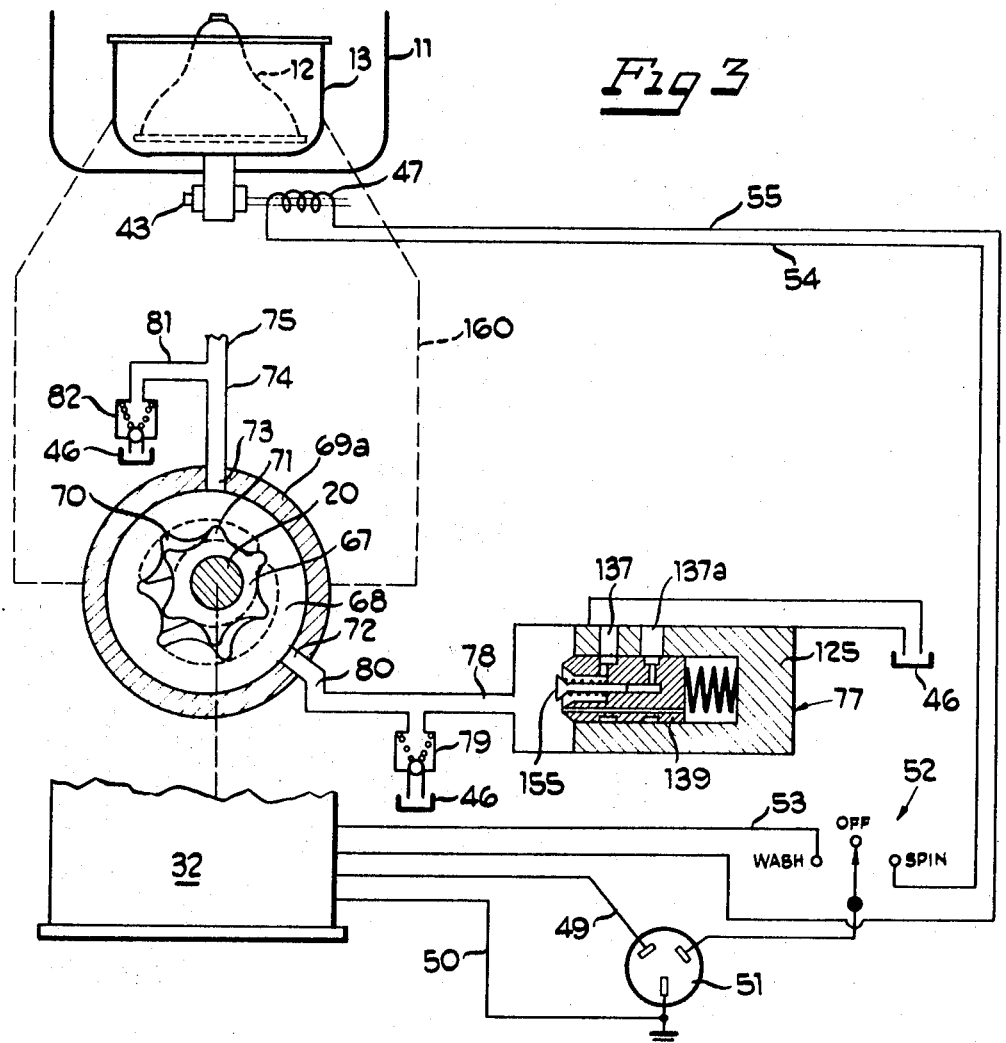
FIG. 3 is a schematic diagram of the hydraulic power transmission of FIG. 1 illustrating various features of the invention.

A fluid sump 46 is provided into which all of the exhaust connections for various elements of the transmission exhaust pressure. For simplicity the sump is illustrated in several locations in FIG. 3. As shown in FIG. 3, electric conductors 49, 53, 54 and 55 interconnect a source of power 51 with motor 32 through a selector switch 52. A ground conductor 50 is also provided. The cycle selector switch 52 is connected to the motor by conductor 53 when in the "WASH" position and by conductor 54 or 55 when in the "SPIN" position. The switch 52 is schematically illustrated in a simplified form although in the washer installation, the cycle selection would be performed by a sequential controller or timer well known in the art. Conductors 54 and 55 also connect a brake solenoid 47 to the switch 52.

The transmission structure comprises a unitary assembly adapted to be drivingly connected to the agitator 12 and to the basket 13 at its upper end and to the drive shaft 20 at its lower end. The transmission structure comprises a housing 56 provided by top and bottom annular plates 57 and 58, and a cylindrical collar 59 extending between the plates and having their top and bottom edges received within circular grooves 61, 60, respectively formed in the plates to provide the sump or reservoir 46 for the hydraulic fluid. Seals are positioned in the grooves and engage the collar to contain the fluid in the sump. The housing 56 contains, and its top and bottom plates 57 and 58 confine, the operating components of the transmission including the vane motor 41 having a housing 64; control valve 42 in a portion of housing 64; and the pump 40. A plurality of bolts 65 extend through and connect the plates 57 and 58, and the vane motor housing 64, to confine the vane motor 41, the vane 42 and the pump 40 therebetween.

The pump is a positive displacement or expansible chamber type pump in the form of a conventional gerotor pump having an inner rotor 67 keyed to the drive shafts 20, and an outer rotor 68 rotatable in a pump housing. The housing comprises a cylindrical ring 69a surrounding the rotors, and top and bottom plates 69b and 69c. The outer rotor 68 is provided with recesses 70 therein adapted to receive the teeth 71 of the inner rotor 67.

Figure 2:
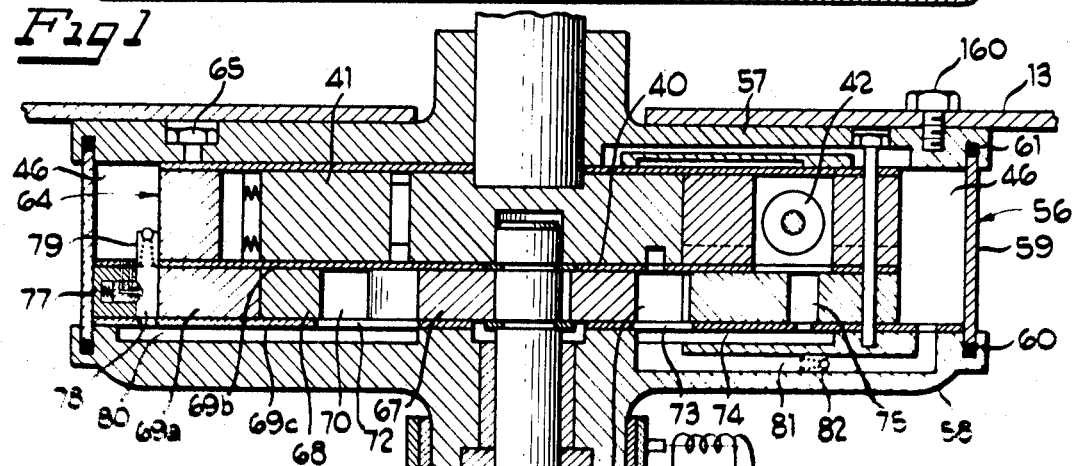
FIG. 2 is a sectional elevational view of the hydraulic power transmission of FIG. 1.

Rotation of the rotor in a clockwise direction causes fluid to pass from the sump 46 into the fluid chamber defined between the recesses 70 and teeth 71 through a passage 78, a one-way check valve 79 and a passage 80 which communicates with a port 72 formed in the plate 69c. The passages 78 and 80 and the one-way check valve 79 are shown in the schematic diagram, FIG. 3, and are also illustrated somewhat schematically in FIG. 2. Rotation of the inner rotor 67 effects sequential engagement of the recesses 70 and teeth 71 to provide fluid under pressure to a port 73 also formed in the bottom plate 69c.

The pressureized fluid is communicated to the control valve 42 through a chamber 74 formed between plate 69c and the plate 58 and a passage or conduit 75. The valve 42 controls fluid flow to the fluid motor 41 in the manner described in the above mentioned U.S. Patent 3,444,709 to oscillate the agitator 12 during the "WASH" cycle of the machine.

The port 73 is also in communication with the sump 46 through a passage 81 normally closed by one-way check valve 82 when fluid is pumped to the valve 42 through chamber 74 and conduit 75.

In accordance with the present invention the transmission 10 includes a flow control valve 77. The valve 77 includes a body 125 engaging the inner surface of the cylindrical collar 59 and contacting the top and bottom plates 69b and 69c. The valve body 125 defines a bore 127 extending generally radially of the axis of rotation of the shaft 20. The bore 127 is open at its radially inner end to the passage 78 and passage 80 which in turn communicates with the port 72. The body 125 further defines a pair of discharge ports 137 and 137a communicating with the sump 46 through the top plate 69b.

Figure 4:
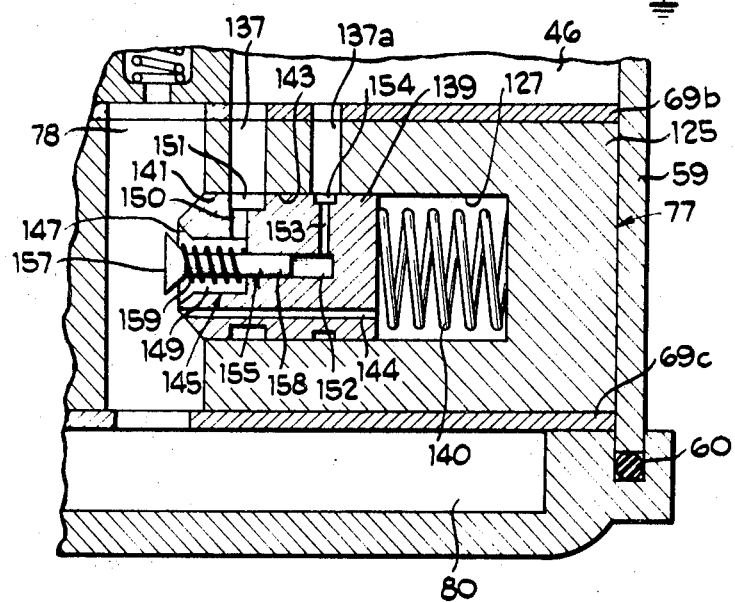
FIG. 4 is a sectional elevational view on a slightly enlarged scale of a portion of the hydraulic power transmission shown in FIGS. 2 and 3 and illustrating various other features of the invention.

As best seen in FIG. 4, a valve spool 139 is slidably disposed within the bore 127 which is biased radially inwardly by spring 140. The spool 139 includes a land 141 which separates passage 78 from port 137 and a land 143 separating ports 137 and 137a. A fluid balance passage 144 is provided communicating passage 78 with the portion of the bore 127 which retains spring 140.

The valve spool 139 is provided with a central bore 145 extending partially through the spool. The bore communicates with the passage 78 at its radially innermost end and through an opening defined by a seat 147. The bore includes an enlarged portion 149 normally communicating with discharge port 137 through a passage 150 and annular relief 151 and a reduced portion 152 normally communicating with port 137a through a passage 153 and an annular relief 154.

A dash-pot valve 155 is disposed within the bore 145 which includes a head 157 defining a seat adapted to seal against the seat 147 of the valve spool bore and a stem 158 slidably disposed in the reduced portion 152 of the bore 145. The dash-pot valve 155 is urged to a normally open position by a biasing spring 159.

The transmission housing top plate 57 contacts the bottom wall of the basket 13 and is secured thereto by bolts 160 extending through the basket wall and into the top plate 57 so that the transmssion housing is secured to the basket. To prevent rotation of the basket and transmission during the washing-agitate operation, the hub of the transmission plate 58 is provided with the brake 43 comprising a brake band 44 having a friction lining 45 normally engaged with the hub to prevent rotation of the basket. The brake is released by solenoid 47 connected to conductors 54 and 55 providing an energizing circuit upon movement of the switch 52 to its "SPIN" position.

Rotation of the basket 13 during the spin-extract cycle is accomplished by reversal of the direction of rotation of the pump 40. The movable contact member of the cycle selector switch 52 is moved from the "WASH" position to the "SPIN" position to control the electric circuits to the motor 32 to energize the motor in the reverse direction, and to energize solenoid 47 via conductors 54 and 55, to cause the brake 43 to release its engagement of the hub of the plate 58. Release of the brake 43 renders the transmission 10 and basket 13 freely rotatable.

Reverse motor rotation causes reverse rotation of the rotors 67 and 68 of the pump 40. As a result, the pump is effective to provide fluid under pressure to the port 72, as opposed to the port 73, as is the case during the "WASH" cycle. Fluid enters the pump 40 through the passage 81, one-way check valve 82, and port 73.

The pump delivers pressurized fluid to the port 72, which communicates with the passage 80 and passage 78. The one-way check valve 79 is closed by the pressurized fluid, preventing the fluid from returning to the sump 46.

When the pump is reversed, the flow control valve 77 is also subjected to the fluid under pressure present in the passage 78. The pressurized fluid can pass to sump through the normally open dash-pot valve 155. The fluid passes into the enlarged portion 149 and through the passage 150, and annular relief 151 into the passage 137 to sump. The flow is sufficiently restricted, however, to develop a reaction torque which begins rotation of the pump cylindrical ring 69a. This, in turn, effects rotation of the basket 13. As pumping continues, the cylindrical rings 69a and basket 13 accelerate. Since the dash-pot valve includes a head 157, exposed to pressurized fluid, and a stem 155, exposed to sump pressure, a differential is established which closes the valve slowly against the action of the spring 159. The resistance to flow thereby increases, and the effective couple between the pump inner rotor 67 connected to the drive shaft 20 and the cylindrical ring 69a supporting the outer rotor 68 is increased. The increasing reaction torque is effective to provide a smooth acceleration of the basket. Closure of the valve head 157 against the seat 147 prevents further flow to sump providing the maximum hydraulic couple between the pump elements.

An important feature of the invention is that when the "SPIN" cycle is initiated, a flow path is provided through the dash-pot valve 155. The pump 40 does not, therefore, present an excessive load against the driving motor 32, as it would if the flow path did not exist. Therefore, the required starting torque is lowered to a satisfactory level, and rotation of the basket 13 may be accomplished smoothly and efficiently.

As the transmission 10 and basket 13 rotate, the valve spool 139 is urged radially outwardly by centrifugal force against the action of the biasing spring 140. When the speed of the basket 13 has reached the desired valve, the land 141 of the spool 139 has been moved radially outwardly to uncover the discharge port 137. The passage 78 is thus placed in communication with the sump again, causing flow of pumped fluid. The resultant fluid flow reduces the effectiveness of the hydraulic couple, thereby limiting the maximum rotational speed of the transmission 10 and basket 13.

As can be seen, a hydraulic power transmission has been provided which includes a flow control valve responsive to fluid pressure and to centrifugal action to control flow.

Various features of the invention have been particularly shown and described. However, it must be appreciated that various modifications may be made without departing from the scope of the invention.

What is claimed is:

1. A fluid flow control valve comprising a valve body defining a central bore open at one end, and at least one discharge port communicating with said bore, a valve spool slidably disposed in said bore, biasing means urging said spool toward said open end, said spool including a land normally separating said open end from said discharge port, said spool being responsive to centrifugal action to move against said biasing means to provide communication between said open end and said discharge port, said spool defining a bore having an end open at said open end defined by said valve body and including a passage communicating said bore with said discharge port of said valve body, and a dash-pot valve slidably disposed in said bore of said spool, biasing means urging said dash-pot valve to an open position providing communication between said open end of said valve body and said discharge port, said dash-pot valve being responsive to fluid under pressure to move to a closed position preventing communication between said open end of said valve body and said discharge port.

2. A fluid flow control valve as claimed in claim 1, wherein said spool defines a seat at said open end of said bore therein, said bore includes an enlarged portion adjacent said seat and a reduced portion spaced therefrom, and said dash-pot valve includes an enlarged head portion adapted to seal against said seat, and a stem slidably supported in said reduced portion of said bore.

3. A fluid flow control valve as claimed in claim 2, wherein said biasing means urging said dash-pot valve to said open position is disposed in said enlarged portion of said bore and acts between said spool and said head portion.

4. A fluid flow control valve as claimed in claim 2, wherein said valve body includes a second discharge port communicating with said bore therein, said valve spool includes a land separating said discharge ports, and defines a passage communicating said second discharge port with said reduced portion of said bore therein.

5. A hydraulic power transmission including a pump having a housing defining an inlet to receive fluid from a sump and an outlet, a pair of rotatable intermeshing pumping elements within said housing, means for effecting rotation of said elements to provide fluid under pressure to said outlet, and a fluid flow control valve comprising a valve body defining a central bore open at one end to said outlet of said pump, and at least one discharge port communicating with said bore and with the sump, a valve spool slidably disposed in said bore, biasing means urging said spool toward said open end, said spool including a land normally separating said open end from said discharge port, to restrict the flow from said outlet to the sump, said spool being responsive to centrifugal action to move against said biasing means to provide communication between said open end and said discharge port, to allow flow to the sump, said spool defining a bore having an end open at said open end defined by said valve body, and including a passage communicating said bore with said discharge port of said valve body, and a dash-pot valve slidably disposed in said bore of said spool, biasing means urging said dash-pot valve to an open position providing communication between said open end of said valve body, and said discharge port to provide an initial flow path from said outlet to said sump, said dash-pot valve being responsive to fluid under pressure to move to a closed position preventing communication between said open end of said valve body and said discharge port to slowly close said flow path.

6. A hydraulic power transmission as claimed in claim 5, wherein said pump includes an inner rotor adapted to be driven by a source of power, said inner rotor includes a plurality of teeth thereon, and an outer rotor surrounding said inner rotor including a plurality of recesses adapted to be engaged by said teeth, said outer rotor being supported by said housing for rotation with respect to said inner rotor.

7. A hydraulic power transmission as claimed in claim 5, wherein said spool defines a seat at said open end of said bore therein, said bore includes an enlarged portion adjacent said seat and a reduced portion spaced therefrom, and said dash-pot valve includes an enlarged head portion adapted to seal against said seat, and a stem slidably supported in said reduced portion of said bore.

8. A hydraulic power transmission as claimed in claim 7, wherein said biasing means urging said dash-pot valve to said open position is disposed in said enlarged portion of said bore and acts between said spool and said head portion.

9. A hydraulic power transmission as claimed in claim 7, wherein said valve body includes a second discharge port communicating with said bore therein and the sump, said valve spool includes a land separating said discharge ports, and defines a passage communicating said second discharge port with said reduced portion of said bore therein.

References Cited

UNITED STATES PATENTS 2,941,539  6/1960  Hewko _____ 137—56
3,444,709  5/1969  Kurtz _____ 68—23.7

CARLTON R. CROYLE, Primary Examiner

R. E. GLUCK, Assistant Examiner

U.S. Cl. X.R.

68—23.7; 137—56